United States Patent
Wu et al.

(10) Patent No.: US 12,302,168 B2
(45) Date of Patent: *May 13, 2025

(54) QoS CONTROL METHOD AND DEVICE

(71) Applicant: Huawei Technologies Co., Ltd., Shenzhen (CN)

(72) Inventors: Yizhuang Wu, Beijing (CN); Chunshan Xiong, Shenzhen (CN); Anni Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/565,829

(22) Filed: Dec. 30, 2021

(65) Prior Publication Data

US 2022/0201542 A1    Jun. 23, 2022

Related U.S. Application Data

(63) Continuation of application No. 17/011,349, filed on Sep. 3, 2020, now Pat. No. 11,259,207, which is a
(Continued)

(51) Int. Cl.
*H04W 28/02* (2009.01)
*H04W 28/24* (2009.01)
(Continued)

(52) U.S. Cl.
CPC ... *H04W 28/0268* (2013.01); *H04W 28/0263* (2013.01); *H04W 28/24* (2013.01); *H04W 48/18* (2013.01); *H04W 76/20* (2018.02)

(58) Field of Classification Search
CPC ......... H04W 28/0268; H04W 28/0263; H04W 28/24; H04W 48/18; H04W 76/20; H04W 28/02; H04L 47/2441
See application file for complete search history.

(56) References Cited

U.S. PATENT DOCUMENTS

2006/0045128 A1    3/2006 Madour
2009/0040983 A1    2/2009 Kim et al.
(Continued)

FOREIGN PATENT DOCUMENTS

CN    101009631 A    8/2007
CN    101094509 A    12/2007
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V0.4.0 (Apr. 2017), 124 pages.
(Continued)

*Primary Examiner* — Mohammed S Chowdhury
(74) *Attorney, Agent, or Firm* — Conley Rose, P.C.

(57) ABSTRACT

A quality of service (QoS) control method and a device, where the method includes: a session management function (SMF) entity obtaining service data flow (SDF)-level QoS control information; the SMF entity sending the SDF-level QoS control information to a terminal; and the terminal performing QoS control on an uplink data packet based on the SDF-level QoS control information, or the terminal deleting the SDF-level QoS control information. The terminal can perform the QoS control on the uplink data packet based on the SDF-level QoS control information.

22 Claims, 8 Drawing Sheets

---

501
An SMF entity obtains SDF-level QoS control information

502
The SMF entity sends the SDF-level QoS control information to a terminal

503
The terminal performs QoS control on an uplink data packet based on the received SDF-level QoS control information, or deletes the SDF-level QoS control information.

Related U.S. Application Data continuation of application No. 16/398,937, filed on Apr. 30, 2019, now Pat. No. 10,772,004, which is a continuation of application No. PCT/CN2017/083671, filed on May 9, 2017.

(51) Int. Cl.
*H04W 48/18* (2009.01)
*H04W 76/20* (2018.01)

(56) References Cited

U.S. PATENT DOCUMENTS

| | | |
|---|---|---|
| 2012/0182889 A1 | 7/2012 | Saund et al. |
| 2012/0224677 A1 | 9/2012 | Riley et al. |
| 2013/0322300 A1 | 12/2013 | Landais |
| 2018/0234876 A1 | 8/2018 | Jheng et al. |
| 2018/0324631 A1* | 11/2018 | Jheng ............... H04W 28/0263 |
| 2018/0376445 A1 | 12/2018 | Yoon et al. |
| 2018/0376446 A1 | 12/2018 | Youn et al. |
| 2019/0075482 A1 | 3/2019 | Eriksson et al. |
| 2019/0150023 A1 | 5/2019 | Cho et al. |
| 2019/0349803 A1 | 11/2019 | Byun et al. |
| 2020/0037197 A1 | 1/2020 | Cho et al. |
| 2020/0267753 A1* | 8/2020 | Adjakple ............... H04W 72/54 |
| 2020/0275302 A1* | 8/2020 | Youn ................... H04W 28/24 |

FOREIGN PATENT DOCUMENTS

| | | |
|---|---|---|
| CN | 103181221 A | 6/2013 |
| CN | 104683956 A | 6/2015 |
| JP | 2007180889 A | 7/2007 |
| JP | 2013546243 A | 12/2013 |
| RU | 2569104 C2 | 11/2015 |
| WO | 2007142565 A1 | 12/2007 |
| WO | 2014016676 A1 | 1/2014 |
| WO | 2017044187 A1 | 3/2017 |
| WO | 2018097599 A1 | 5/2018 |
| WO | 2018104171 A1 | 6/2018 |

OTHER PUBLICATIONS

Intel et al., "23.501: Alignment of QoS rule terminology," 3GPP TSG SA WG2 Meeting #121, S2-174039, May 15-19, 2017, Hangzhou, P.R. China (merger of 3343, 3480), 4 pages.
CATT, "23.501 SDF level QoS rule and QoS flow level QoS rule," S2-172054, Sa WG2 Meeting #120, Mar. 27-31, 2017, Busan, Korea, 5 pages.
Huawei, et al., "QoS control based on 5G QoS Flow," 3GPP Draft; XP051217094, S2-170973, Feb. 13, 2017, 4 pages.
Huawei, et al., "TS23. 501 Reflective QoS deactivation," 3GPP Draft; XP051257938, S2-172371, Apr. 3, 2017, 3 pages.
Huawei, et al., "TS23. 501 Reflective QoS deactivation," 3GPP Draft; XP051257938, S2-172371, Mar. 27-31, 2007, 3 pages.
"3rd Generation Partnership Project; Technical Specification Group Services and System Aspects; System Architecture for the 5g System; Stage 2 (Release 15)," 3GPP TS 23.501 V0.3.1, Mar. 2017, 97 pages.
"3rd Generation Partnership Project; Technical Specification Group Services and System Aspects; Policy and charging control architecture (Release 13)," 3GPP TS 23.203 V13.6.0, Dec. 2015, 242 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.0.0, Jun. 2016, 374 pages.
Ericsson, "23.501: Cleanup of QoS framework description," S2-171755, SA WG2 Meeting #120, Mar. 27-31, 2017, Busan, Korea, 12 pages.
Ericsson, et al., 23.501: Cleanup of QoS framework description, S2-172319, SA WG2 Meeting #120, Mar. 27-31, 2017, Busan, Korea, 10 pages.
Huawei, et al., "Details and alignments for the QoS rule granularity," S2-173480, SA WG2 Meeting #121, May 15-19, 2017, Hangzhou, P. R. China, 5 pages.
3GPP TS 23.502 V0.3.0 "3rd Generation Partnership Project; Technical Specification Group Services and System Aspects;Procedures for the 5G System;Stage 2(Release 15)," Mar. 2017, 115 pages.
3GPP TS 38.300 V0.2.0 "3rd Generation Partnership Project; Technical Specification Group Radio Access Network;NG Radio Access Network; Overall Description; Stage 2(Release 15)," May 2017, 33 pages.

\* cited by examiner

QoS CONTROL METHOD AND DEVICE

CROSS-REFERENCE TO RELATED APPLICATIONS

This application is a continuation of U.S. patent application Ser. No. 17/011,349, filed on Sep. 3, 2020, which is a continuation of U.S. patent application Ser. No. 16/398,937, filed on Apr. 30, 2019, now U.S. Pat. No. 10,772,004, which is a continuation of International Patent Application No. PCT/CN2017/083671, filed on May 9, 2017. All of the aforementioned patent applications are hereby incorporated by reference in their entireties.

TECHNICAL FIELD

This application relates to the field of communications technologies, and in particular, to a quality of service (QoS) control method and a device.

BACKGROUND

Wireless networks have been used by more people or machines, and more services are carried on the wireless networks. Various services such as a call, a conference call, an emergency call, and a public warning in the wireless networks have respective clear service assurance requirements.

Due to limited radio resources, if a relatively large quantity of services need to be simultaneously processed, access, resource scheduling, and the like need to be controlled based on a QoS rule and a priority of each service. For example, when a user A is in a call, a user B starts downloading a file. Due to limited radio resources, if the download service of the user B preempts a radio resource of the call service of the user A, user experience is extremely terrible. Therefore, a priority higher than that of the download service needs to be set for the call service, to preferentially ensure radio resource scheduling of the call service when radio resources are insufficient.

Specifically, a QoS architecture may be shown in FIG. 1. A terminal may establish one or more packet data unit (PDU) sessions with a $5^{th}$ Generation (5G) core network, and a radio access network (RAN)/access network (AN) establishes one or more data radio bearers (DRBs) for each PDU session. One DRB includes one or more QoS flows, and each QoS flow corresponds to one or more packet filters. For example, if a QoS flow 1 corresponds to a packet filter 1 and a packet filter 2, only a data packet that can pass through the packet filter 1 or the packet filter 2 can be transmitted using the QoS flow 1. In addition, one QoS flow corresponds to one group of QoS parameters, and same QoS processing is performed on data packets transmitted using a same QoS flow.

Different services correspond to different service data flows (SDFs), and one SDF may correspond to one or more packet filters or one application detection filter. For example, if a service 1 corresponds to an SDF 1, and the SDF 1 corresponds to a packet filter 3 and a packet filter 4, a data packet belonging to the service 1 can pass through the packet filter 3 or the packet filter 4.

Mapping rules are different when QoS control is performed on an uplink/downlink data packet on a terminal side and a network side, to be specific, when the uplink/downlink data packet is mapped to a QoS flow. Therefore, in some particular cases, the uplink/downlink data packet may be mapped to different QoS flows on the terminal side and the network side, causing a packet loss.

SUMMARY

Embodiments of this application provide a QoS control method and a device, to perform QoS control on an uplink data packet.

According to a first aspect, an embodiment of this application provides a QoS control method, including: obtaining, by a session management function (SMF) entity, SDF-level QoS control information; and sending, by the SMF entity, the SDF-level QoS control information to a terminal.

In a possible implementation, the method further includes sending, by the SMF entity, the SDF-level QoS control information to a user plane function (UPF) entity, such that the UPF verifies QoS control on an uplink data packet based on the SDF-level QoS control information, or deletes the SDF-level QoS control information.

In a possible implementation, the obtaining, by an SMF entity, SDF-level QoS control information includes: obtaining, by the SMF entity, the SDF-level QoS control information based on a session management request sent by a policy control function (PCF) entity; or obtaining, by the SMF entity, the SDF-level QoS control information based on a local policy.

In a possible implementation, the SDF-level QoS control information includes: an SDF identifier; or an SDF identifier and at least one of or any combination of the following: at least one packet filter corresponding to the SDF, a priority, a QoS flow identifier, or a QoS parameter.

In a possible implementation, the SDF-level QoS control information includes: a QoS flow identifier; or a QoS flow identifier and at least one of or any combination of the following: at least one SDF identifier, at least one packet filter corresponding to the at least one SDF, a priority corresponding to the at least one SDF, or a QoS parameter corresponding to the QoS flow.

In a possible implementation, the SDF-level QoS control information includes: a QoS rule identifier; or a QoS rule identifier and at least one of or any combination of the following: at least one packet filter corresponding to the QoS rule, a priority, a QoS flow identifier, or a QoS parameter.

In a possible implementation, the method further includes: sending, by the SMF entity to an access network device, the QoS flow identifier, or the QoS flow identifier and the QoS parameter corresponding to the QoS flow, such that the access network device establishes, releases, or binds to a corresponding air interface resource.

According to a second aspect, an embodiment of this application provides a QoS control method, including: receiving, by a terminal, an SDF-level QoS control information sent by a session management function (SMF) entity; and performing, by the terminal, QoS control on an uplink data packet based on the SDF-level QoS control information, or deleting the SDF-level QoS control information.

In a possible implementation, the SDF-level QoS control information includes: an SDF identifier; or an SDF identifier and at least one of or any combination of the following: at least one packet filter corresponding to the SDF, a priority, a QoS flow identifier, or a QoS parameter.

In a possible implementation, the SDF-level QoS control information includes: a QoS flow identifier; or a QoS flow identifier and at least one of or any combination of the following: at least one SDF identifier, at least one packet filter corresponding to the at least one SDF, a priority corresponding to the at least one SDF, or a QoS parameter corresponding to the QoS flow.

In a possible implementation, the SDF-level QoS control information includes: a QoS rule identifier; or a QoS rule identifier and at least one of or any combination of the following: at least one packet filter corresponding to the QoS rule, a priority, a QoS flow identifier, or a QoS parameter.

In a possible implementation, the performing, by the terminal, QoS control on an uplink data packet based on the SDF-level QoS control information includes: determining, by the terminal, a matching order of SDF-level packet filters based on the priority in the SDF-level QoS control information; performing, by the terminal, data packet matching based on the matching order of the SDF-level packet filters; and performing the QoS control based on a QoS flow corresponding to a packet filter that successfully matches the uplink data packet.

According to a third aspect, an embodiment of the present application provides a session management function (SMF) entity. The SMF entity has a function of implementing the SMF entity in the foregoing method examples. The function may be implemented by hardware, or may be implemented by hardware by executing corresponding software. The hardware or software includes one or more modules corresponding to the function.

In a possible design, a structure of the SMF entity includes a processing unit and a communications unit. The processing unit is configured to support the SMF entity in performing a corresponding function in the foregoing methods. The communications unit is configured to support communication between the SMF entity and another device. The SMF entity may further include a storage unit, and the storage unit is configured to be coupled to the processing unit, and stores a program instruction and data that are necessary for the SMF entity.

For example, the processing unit may be a processor, the communications unit may be a transceiver, and the storage unit may be a memory.

According to a fourth aspect, an embodiment of this application provides a session management function (SMF) entity, including: a processor, a memory and a transceiver that are separately connected to the processor. The processor is configured to invoke a computer program pre-stored in the memory to perform the following steps: obtaining SDF-level QoS control information; and sending the SDF-level QoS control information to a terminal using the transceiver.

In a possible implementation, the processor is further configured to send the SDF-level QoS control information to a UPF entity using the transceiver, such that the UPF verifies QoS control on an uplink data packet based on the SDF-level QoS control information, or deletes the SDF-level QoS control information.

In a possible implementation, when obtaining the SDF-level QoS control information, the processor is configured to: obtain the SDF-level QoS control information based on a session management request sent by a policy control function (PCF) entity; or obtain the SDF-level QoS control information based on a local policy.

In a possible implementation, the SDF-level QoS control information includes: an SDF identifier; or an SDF identifier and at least one of or any combination of the following: at least one packet filter corresponding to the SDF, a priority, a QoS flow identifier, or a QoS parameter.

In a possible implementation, the SDF-level QoS control information includes: a QoS flow identifier; or a QoS flow identifier and at least one of or any combination of the following: at least one SDF identifier, at least one packet filter corresponding to the at least one SDF, a priority corresponding to the at least one SDF, or a QoS parameter corresponding to the QoS flow.

In a possible implementation, the SDF-level QoS control information includes: a QoS rule identifier; or a QoS rule identifier and at least one of or any combination of the following: at least one packet filter corresponding to the QoS rule, a priority, a QoS flow identifier, or a QoS parameter.

In a possible implementation, the processor is further configured to send, to an access network device using the transceiver, the QoS flow identifier, or the QoS flow identifier and the QoS parameter corresponding to the QoS flow, such that the access network device establishes, releases, or binds to a corresponding air interface resource.

According to a fifth aspect, an embodiment of the present application provides a terminal. The terminal has a function of implementing the terminal behaviors in the foregoing method examples. The function may be implemented by hardware, or may be implemented by hardware by executing corresponding software. The hardware or software includes one or more modules corresponding to the function.

In a possible design, a structure of the terminal includes a processing unit and a communications unit. The processing unit is configured to support the terminal in performing a corresponding function in the foregoing methods. The communications unit is configured to support communication between the terminal and another device. The terminal may further include a storage unit configured to be coupled to the processing unit, and the storage unit stores a program instruction and data that are necessary for the terminal.

For example, the processing unit may be a processor, the communications unit may be a transceiver, and the storage unit may be a memory.

According to a sixth aspect, an embodiment of this application provides a terminal, including: a processor, a memory and a transceiver that are separately connected to the processor. The processor is configured to invoke a computer program pre-stored in the memory to perform the following steps: receiving, using the transceiver, SDF-level QoS control information sent by a session management function (SMF) entity; and performing QoS control on an uplink data packet based on the SDF-level QoS control information, or deleting the SDF-level QoS control information.

In a possible implementation, the SDF-level QoS control information includes: an SDF identifier; or an SDF identifier and at least one of or any combination of the following: at least one packet filter corresponding to the SDF, a priority, a QoS flow identifier, or a QoS parameter.

In a possible implementation, the SDF-level QoS control information includes: a QoS flow identifier; or a QoS flow identifier and at least one of or any combination of the following: at least one SDF identifier, at least one packet filter corresponding to the at least one SDF, a priority corresponding to the at least one SDF, or a QoS parameter corresponding to the QoS flow.

In a possible implementation, the SDF-level QoS control information includes: a QoS rule identifier; or a QoS rule identifier and at least one of or any combination of the following: at least one packet filter corresponding to the QoS rule, a priority, a QoS flow identifier, or a QoS parameter.

In a possible implementation, the processor is further configured to: determine a matching order of SDF-level packet filters based on the priority in the SDF-level QoS control information; perform data packet matching based on the matching order of the SDF-level packet filters; and perform the QoS control based on a QoS flow corresponding to a packet filter that successfully matches the uplink data packet.

According to a seventh aspect, an embodiment of the present application provides a communications system. The system includes the SMF entity according to the foregoing aspects. In another possible design, the system may further include another device such as a PCF, a UPF, or a terminal device that interacts with the SMF entity in the solutions provided in the embodiments of the present application.

According to an eighth aspect, an embodiment of the present application provides a computer storage medium configured to store a computer software instruction used by the foregoing SMF entity, and the instruction includes a program designed to perform the foregoing aspects.

According to a ninth aspect, an embodiment of the present application provides a computer storage medium configured to store a computer software instruction used by the foregoing terminal, and the instruction includes a program designed to perform the foregoing aspects.

According to a tenth aspect, this application further provides a computer program product including an instruction. When run on a computer, the computer program product causes the computer to perform the methods according to the foregoing aspects.

DESCRIPTION OF EMBODIMENTS

The following further describes the embodiments of this application in detail with reference to the accompanying drawings.

The applicant finds during research that, the following problem exists when a terminal and a device on a network side perform QoS control on an uplink/downlink data packet in other approaches.

Figure 1:
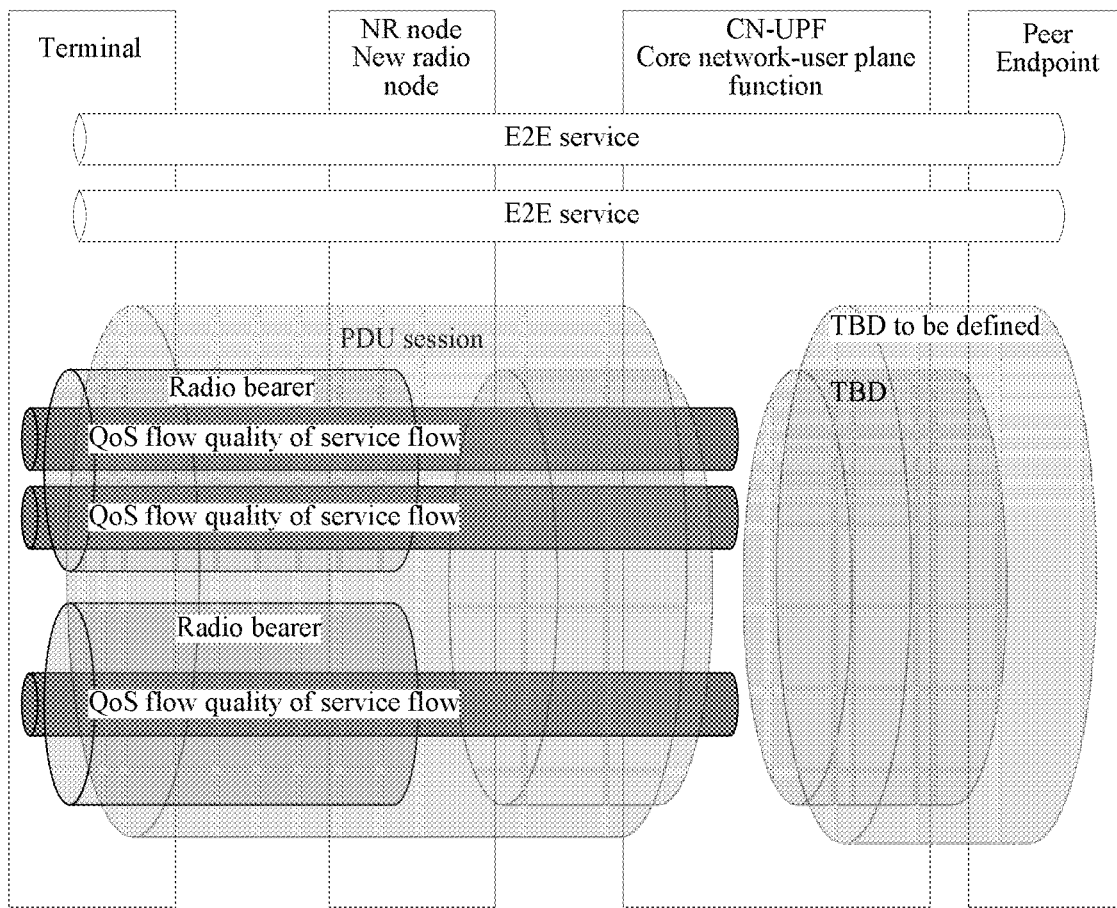
FIG. 1 is a schematic diagram of a QoS architecture according to an embodiment of this application.
Figure 2:
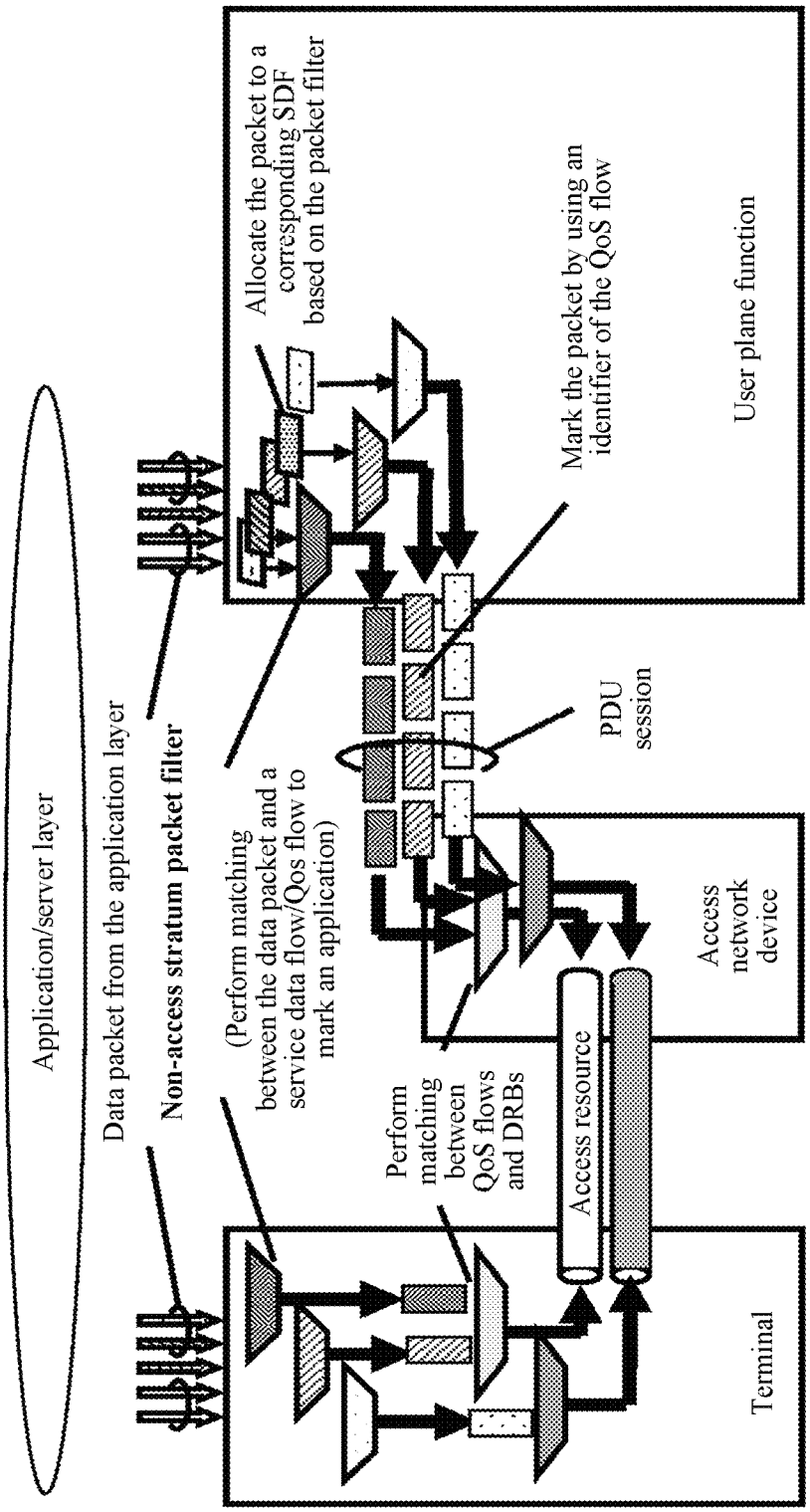
FIG. 2 is a schematic diagram of mapping an uplink/downlink data packet to a QoS flow according to an embodiment of this application.

A non-access stratum (NAS) of the terminal and a user plane function (UPF) on the network side map the uplink/downlink data packet to a QoS flow based on a packet filter; and an access stratum (AS) of the terminal and a RAN/AN associate an uplink/downlink QoS flow with a DRB. When the terminal and the UPF on the network side map the data packet to the QoS flow, a mapping mechanism may be shown in FIG. 2. Details are as follows.

On a terminal side, for the terminal, each QoS flow corresponds to one QoS flow template, each QoS flow template corresponds to one or more packet filters, and each QoS flow template has one priority. When sending a data packet, the terminal sequentially performs matching between the data packet and QoS flow templates in descending order of priorities of the QoS flow templates, and stops matching when a corresponding QoS flow template is found through matching. For example, matching is first performed between the data packet and a QoS flow template with a highest priority. If the data packet can pass through any packet filter corresponding to the QoS flow template, the matching succeeds, and the data packet is transmitted using a QoS flow corresponding to the QoS flow template. Otherwise, matching continues to be performed between the data packet and a QoS flow template with a lower priority, until a corresponding QoS flow template is found through matching.

On the network side, for the UPF, each SDF corresponds to one or more packet filters, and each SDF corresponds to one priority. When sending a data packet, a network device sequentially performs matching between the data packet and packet filters of SDFs based on priorities of the SDFs, and stops matching when a packet filter of a corresponding SDF is found through matching. For example, matching is first performed between the data packet and a packet filter of an SDF with a highest priority. If the data packet can pass through the packet filter of the SDF, the matching succeeds, and the data packet is transmitted using a QoS flow corresponding to the packet filter of the SDF; otherwise, matching continues to be performed between the data packet and a packet filter of an SDF with a lower priority.

Figure 3:
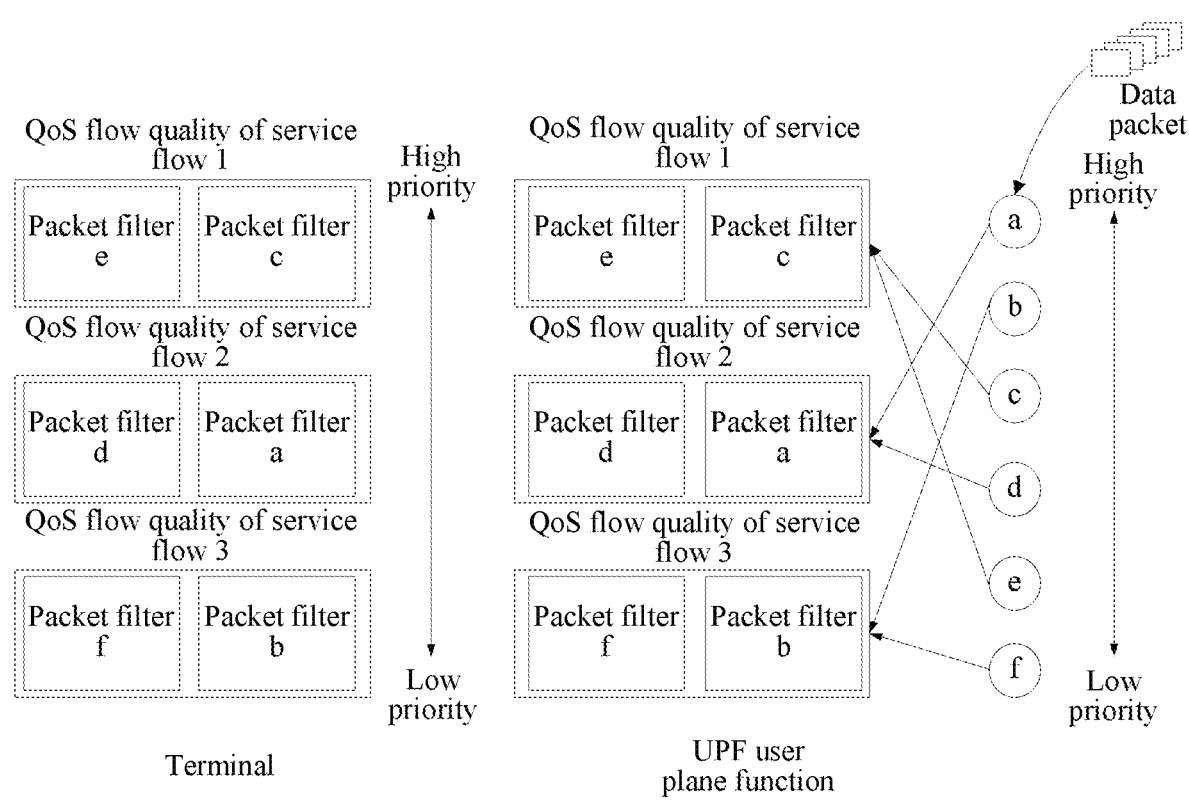
FIG. 3 is a schematic diagram of a matching error occurring when an uplink/downlink data packet is mapped to a QoS flow according to an embodiment of this application.

In the foregoing mechanism, different matching rules are used on the terminal side and the network side to perform data packet matching. Consequently, different QoS flows may be found through matching for a same data packet on the terminal side and the network side, causing a packet loss. For example, as shown in FIG. 3, when a terminal needs to transmit a data packet, if the data packet can match both a packet filter of an SDF d and a packet filter of an SDF e, due to different matching priorities, the uplink data packet may match a QoS flow 1 on a terminal side, and the data packet may match a QoS flow 2 on a network side. During uplink data transmission, it may be verified, on the network side, whether a correct QoS flow is used for the data packet sent by the terminal. If it is determined, on the network side, that the terminal uses an incorrect QoS flow, the data packet is discarded on the network side.

To resolve the foregoing technical problem, the embodiments of this application provide a QoS control method and a device.

The terminal in this application may include a handheld device, an in-vehicle device, a wearable device, or a computing device that has a wireless communication function, or another processing device connected to a wireless modem, and various forms of a user equipment (UE), mobile stations (MSs), terminal devices, and the like.

Figure 4:
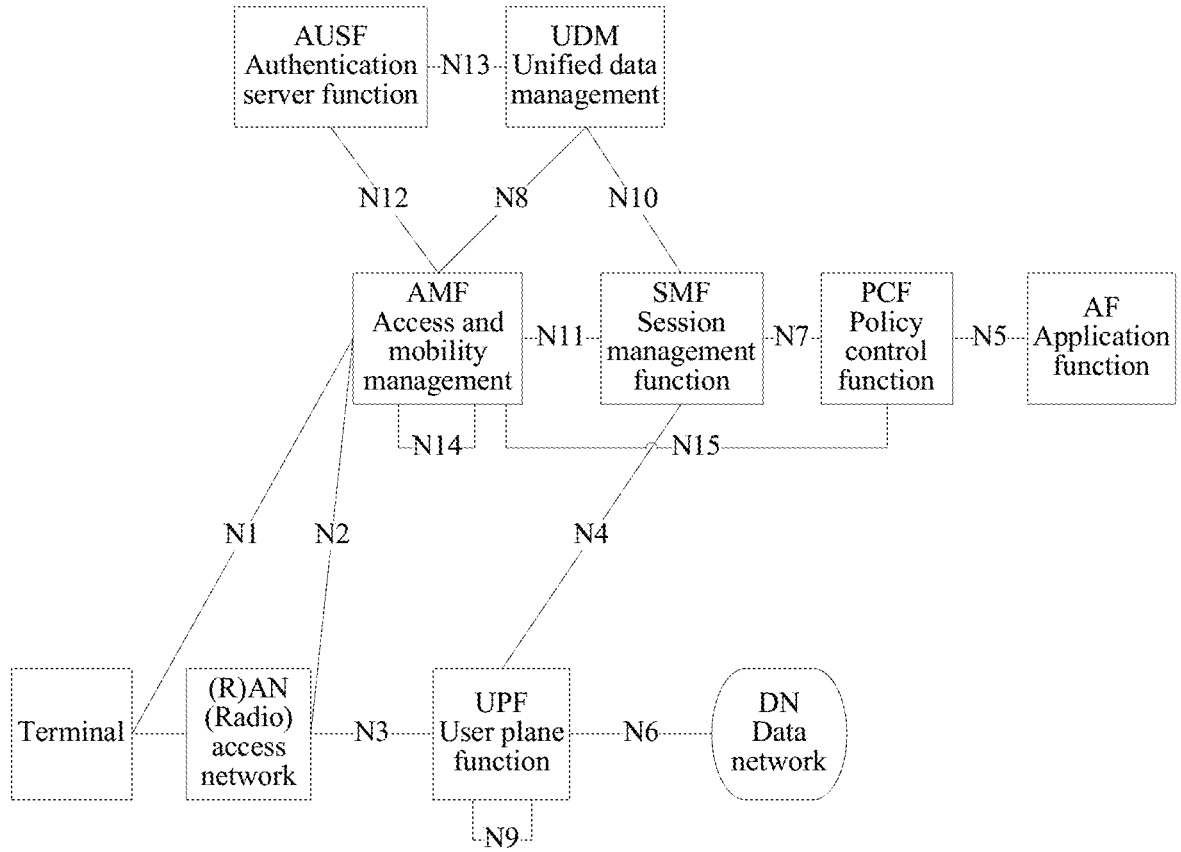
FIG. 4 is a schematic diagram of a system architecture applicable to the embodiments of this application according to an embodiment of this application.

The QoS control method provided in the embodiments of this application may be applied to a 5G network architecture shown in FIG. 4.

Main functions of a user plane function (UPF) include: data packet routing and transmission, packet detection, service usage reporting, QoS processing, lawful interception, uplink packet detection, downlink data packet storage, and other user plane related functions.

Main functions of an access and mobility management function (AMF) include: connection management, mobility management, registration management, access authentication and authorization, accessibility management, security context management, and other access and mobility related functions.

Main functions of session management function (SMF) include: session management (for example, session establishment, modification, and release, including tunnel maintenance between a UPF and an RAN/AN), UPF selection and control, service and session continuity (SSC) mode selection, roaming, and other session related functions.

Main functions of a policy control function (PCF) include: unified policy development, policy control provisioning, obtaining policy and decision related subscription information from a UDR, and other policy related functions.

A main function of an authentication server function (AUSF) includes: authenticating whether user equipment is authorized.

A main function of an application function (AF) is service provisioning, and includes: service routing, access network capability enablement, and interaction with a policy architecture.

Main functions of unified data management (UDM) are credential, location, and subscription management, and user subscription data storage.

A main function of a data network (DN) is providing a specific data service, such as an operator service, an Internet access service, or a third-party service.

Certainly, FIG. 4 shows merely an example of an application scenario of the embodiments of this application, and constitutes no limitation to the application scenario of the embodiments of this application. A system architecture applicable to the embodiments of this application may include more or fewer network elements than those shown in FIG. 4, or may be a different system architecture such as an Evolved Packet System (EPS) architecture or a Control and User Plane Separation (CUPS) architecture.

Figure 5:
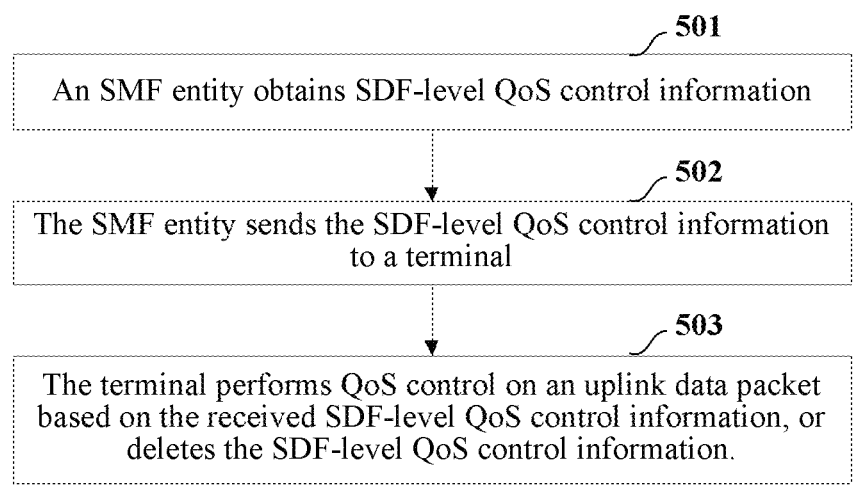
FIG. 5 is a schematic flowchart of a QoS control method according to an embodiment of this application.

Referring to FIG. 5, FIG. 5 is a schematic flowchart of a QoS control method according to an embodiment of this application. As shown in the figure, the method includes the following steps.

Step 501: An SMF entity obtains SDF-level QoS control information.

Step 502: The SMF entity sends the SDF-level QoS control information to a terminal.

Step 503: The terminal performs QoS control on an uplink data packet based on the received SDF-level QoS control information, or the terminal deletes the SDF-level QoS control information.

In this embodiment, the SDF-level QoS control information obtained by the SMF entity is used to perform QoS control on an SDF. The SMF entity sends the SDF-level QoS control information to the terminal, such that the terminal performs the QoS control on the uplink data packet.

In a possible implementation, the SDF-level QoS control information indicates that at least one packet filter corresponding to one SDF corresponds to a same QoS flow, to be more specific, corresponds to a same QoS parameter, and each packet filter has a same SDF-level priority. However, different SDFs correspond to different priorities. Different SDFs may correspond to a same QoS parameter, to be more specific, may correspond to a same QoS flow, but priorities of packet filters corresponding to the different SDFs are different.

It may be understood that the SDF-level QoS control information includes any one of or any combination of following: an SDF-level identifier, at least one SDF-level packet filter, an SDF-level priority (namely, a priority of the SDF-level packet filter), a QoS flow identifier, or a QoS parameter. The SDF-level identifier may have a plurality of representation forms, for example, an SDF identifier (ID), a QoS rule ID, or other various forms of identifiers that can embody an SDF level.

Similarly, in this embodiment of this application, the SDF-level QoS control information obtained by the SMF entity has various representation forms, including but not limited to the following three manners.

In this embodiment of this application, the QoS control information obtained by the SMF entity is of an SDF level, but has various representation forms.

In a first manner, an SDF is used as a control unit.

In this manner, the SDF-level QoS control information may include any one of or any combination of following: an SDF identifier, at least one packet filter corresponding to the SDF, a priority, a QoS flow identifier, or a QoS parameter.

The following three scenarios may be included.

In a first scenario, a new SDF is added.

In this case, the SDF-level QoS control information obtained by the SMF entity includes: an identifier of the newly added SDF; a packet filter such as at least one packet filter corresponding to the SDF; a priority such as a priority corresponding to the SDF, namely, a priority of the packet filter; and a QoS flow identifier such as an identifier of a QoS flow corresponding to the SDF, to be more specific, a data packet belonging to the SDF is transmitted using the QoS flow.

Optionally, the SDF-level QoS control information includes a QoS parameter: a QoS parameter corresponding to the QoS flow, for example, a packet delay, a bit rate, or a packet loss rate.

Further, if the QoS flow is a non-guaranteed bit rate (non-GBR) QoS flow, the QoS parameter may further include a 5G QoS Indicator (5QI). If the QoS flow is a guaranteed bit rate (GBR) QoS flow, the QoS parameter may include a 5QI, a notification, a guaranteed flow bit rate (GFBR), and a maximum flow bit rate (MFBR).

In a second scenario, an existing SDF is modified.

In this case, the SDF-level QoS control information obtained by the SMF entity includes at least an identifier of the to-be-modified SDF, and further includes any one of or any combination of the following information: a packet filter such as at least one packet filter corresponding to the SDF, or at least one to-be-deleted packet filter corresponding to the SDF, or at least one updated packet filter corresponding to the SDF; a priority such as a modified priority corresponding to the SDF; a QoS flow identifier such as an identifier of a modified QoS flow corresponding to the SDF; or a QoS parameter such as a modified QoS parameter corresponding to the SDF.

Further, if the modified QoS flow is a non-GBR QoS flow, the QoS parameter may further include a 5QI. If the QoS flow is a GBR QoS flow, the QoS parameter may include a 5QI, a notification, a GFBR, and an MFBR.

In a third scenario, an existing SDF is deleted.

In this case, the SDF-level QoS control information obtained by the SMF entity may include only an identifier of the to-be-deleted SDF.

In a second manner, an SDF in a QoS flow is used as a control unit.

In this manner, the SDF-level QoS control information may include any one of or any combination of following: a QoS flow identifier, at least one SDF identifier, at least one packet filter corresponding to the at least one SDF, a priority corresponding to the at least one SDF, or a QoS parameter corresponding to the QoS flow.

For example, when the QoS flow is used as a QoS control unit, the following three scenarios may be included.

In a first scenario, a new QoS flow is established.

In this case, the SDF-level QoS control information obtained by the SMF entity includes an identifier of the newly established QoS flow, and may further include: an SDF identifier such as at least one SDF identifier corresponding to the newly established QoS flow, for example, an SDF identifier 1 corresponding to the added QoS flow, and an SDF identifier 2 corresponding to the added QoS flow; a packet filter such as at least one packet filter corresponding to each SDF, for example, a packet filter 1 and a packet filter 2 that correspond to the SDF 1, and a packet filter 3 and a packet filter 4 that correspond to the SDF 2; and a priority such as a priority corresponding to each SDF.

Optionally, the SDF-level QoS control information includes a QoS parameter: a QoS parameter corresponding to the newly established QoS flow.

Further, if the newly established QoS flow is a non-GBR QoS flow, the QoS parameter may further include a 5QI. If the newly established QoS flow is a GBR QoS flow, the QoS parameter may include a 5QI, a notification, a GFBR, and an MFBR.

In a second scenario, an existing QoS flow is modified.

In this case, the QoS control information obtained by the SMF entity includes at least an identifier of the to-be-modified QoS flow, and further includes any one of or any combination of the following information: an SDF identifier such as an identifier of a to-be-added SDF corresponding to the QoS flow, or an identifier of a to-be-modified SDF corresponding to the QoS flow, or an identifier of a to-be-deleted SDF corresponding to the QoS flow; a packet filter, where if an SDF corresponding to the QoS flow is to be added, the packet filter includes at least one packet filter corresponding to the added SDF; or if an existing packet filter corresponding to an SDF 1 corresponding to the QoS flow is modified, the packet filter includes at least one to-be-added packet filter corresponding to the SDF 1, or at least one to-be-deleted packet filter corresponding to the SDF 1, or at least one modified packet filter corresponding to a to-be-modified SDF; a priority, where if an SDF corresponding to the QoS flow is to be added, the priority includes a priority corresponding to the to-be-added SDF; or if a priority of an SDF corresponding to the QoS flow is modified, the priority includes a modified priority corresponding to the SDF; and a QoS parameter such as a modified QoS parameter corresponding to the QoS flow.

Further, if the modified QoS flow is a non-GBR QoS flow, the QoS parameter may further include a 5QI. If the modified QoS flow is a GBR QoS flow, the QoS parameter may include a 5QI, a notification, a GFBR, and an MFBR.

In a third scenario, an existing QoS flow is deleted.

In this case, the SDF-level QoS control information obtained by the SMF entity may include an identifier of the to-be-deleted QoS flow.

In a third manner, a QoS rule is used as a control unit.

In this manner, one QoS rule corresponds to one SDF. The SDF-level QoS control information may include any one of or any combination of the following: a QoS rule identifier, at least one packet filter corresponding to the QoS rule, a priority, a QoS flow identifier, or a QoS parameter.

For example, when the QoS flow is used as a QoS control unit, the following three scenarios may be included.

In a first scenario, a QoS rule is added.

In this case, the SDF-level QoS control information obtained by the SMF entity includes an identifier of the newly added QoS rule, and further includes the following information: a packet filter such as at least one packet filter corresponding to the added QoS rule; a priority such as a priority corresponding to the added QoS rule, namely, a priority of the packet filter; and a QoS flow identifier such as a QoS flow identifier corresponding to the added QoS rule.

Optionally, the SDF-level QoS control information includes a QoS parameter: a QoS parameter corresponding to the QoS flow.

Further, if the QoS flow corresponding to the added QoS rule is a non-GBR QoS flow, the QoS parameter may further include a 5QI. If the QoS flow corresponding to the added QoS rule is a GBR QoS flow, the QoS parameter may include a 5QI, a notification, a GFBR, and an MFBR.

In a second scenario, an existing QoS rule is modified.

In this case, the SDF-level QoS control information obtained by the SMF entity includes at least an identifier of the to-be-modified QoS rule, and further includes any one of or any combination of the following information: a packet filter such as at least one to-be-added packet filter corresponding to the QoS rule, or at least one to-be-deleted packet filter corresponding to the QoS rule, or at least one modified packet filter corresponding to the QoS rule; a priority such as a modified priority corresponding to the QoS rule; a QoS flow identifier such as an identifier of a modified QoS flow corresponding to the QoS rule; and a QoS parameter such as a modified QoS parameter corresponding to the modified QoS flow.

Further, if the modified QoS flow is a non-GBR QoS flow, the QoS parameter may further include a 5QI. If the modified QoS flow is a GBR QoS flow, the QoS parameter may include a 5QI, a notification, a GFBR, and an MFBR.

In a third scenario, an existing QoS rule is deleted.

In this case, the SDF-level QoS control information obtained by the SMF entity may include only an identifier of the to-be-deleted QoS rule.

During implementation, one of the foregoing three manners may be selected based on an application requirement. The SDF-level QoS control information is sent to the terminal, such that the terminal performs the QoS control on the uplink data packet based on the SDF-level QoS control information.

In a possible implementation, the SMF entity may further send the SDF-level QoS control information to a UPF entity, such that the UPF entity verifies the QoS control on the uplink data packet based on the SDF-level QoS control information.

The SMF entity sends the SDF-level QoS control information to the terminal and the UPF entity. As such, the terminal and the UPF can separately perform the QoS control on the uplink data packet based on the same QoS control information, thereby avoiding a packet loss caused by different QoS control performed by the terminal and the UPF on uplink data.

In some embodiments, the SMF entity may further send, to an access network device, the following two types of information: the QoS flow identifier, or the QoS flow identifier and the QoS parameter corresponding to the QoS flow, such that the access network device establishes, deletes, or binds to a corresponding air interface resource based on the foregoing information.

In a possible implementation, step 501 performed by the SMF entity is: receiving a policy control rule or a QoS control rule sent by a PCF entity; and obtaining, by the SMF, the SDF-level QoS control information based on the received policy control rule or QoS control rule. For example, the PCF entity may send a PDU-connectivity access network (CAN) session modification instruction to the SMF entity, where the policy control rule or the QoS control rule is carried in the PDU session modification instruction.

In another possible implementation, step 501 performed by the SMF entity includes obtaining the SDF-level QoS control information based on a policy stored in the SMF entity.

In either of the foregoing possible implementations, a policy stored in the PCF entity or the policy stored in the SMF entity includes a basis of updating the SDF-level QoS control information. For example, when network load meets a preset condition, the PCF entity or the SMF entity needs to update the SDF-level QoS control information, to ensure that QoS of an important service is not affected.

Further, in step 503, that the terminal performs QoS control on an uplink data packet includes: determining, by the terminal, a matching order of SDF-level packet filters based on the priority in the received SDF-level QoS control information; performing data packet matching based on the matching order of the SDF-level packet filters; and performing the QoS control based on a QoS flow corresponding to a packet filter that successfully matches the uplink data packet.

For clearer understanding of the QoS control method provided in the embodiments of the present application, several embodiments are used for description below.

Embodiment 1

Figure 6:
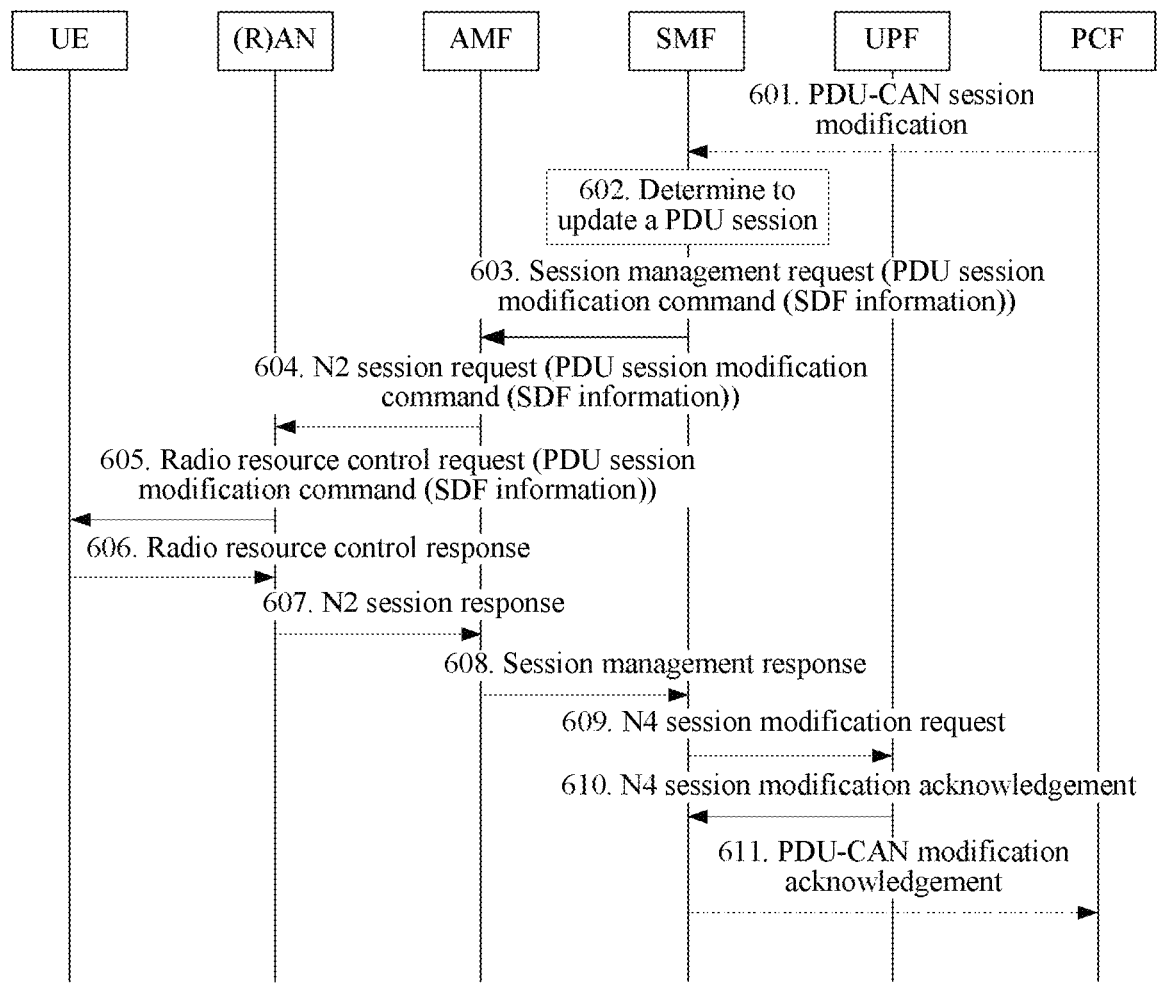
FIG. 6 is a schematic flowchart of Embodiment 1 according to embodiments of this application.

A procedure is described with reference to FIG. 6.

Step 601: A PCF entity sends a PDU-CAN session modification request to an SMF entity, where the request includes a policy control rule information.

Further, the request may further include a QoS requirement.

Optionally, the policy control rule information is used to establish a new policy control rule; or the policy control rule information is used to modify an existing policy control rule; or the policy control rule information is used to delete an existing policy control rule.

Step 602: After receiving the PDU-CAN session modification request, the SMF entity determines to perform a PDU session update procedure.

Step 603: The SMF entity sends a session management request to an AMF entity, where the session management request includes NAS signaling (for example, a PDU session modification command, where the PDU session modification command is used as an example for description in the figure). Additionally, the NAS signaling includes the foregoing SDF-level QoS control information, namely, SDF information.

If the SMF entity determines, based on the received policy control rule information, to establish a new SDF, the SDF-level QoS control information includes: an SDF ID of the newly established SDF, at least one packet filter corresponding to the SDF, a priority, and a QoS parameter. For example, a format of the SDF-level QoS control information may be: SDF ID, QoS parameters, QoS flow identifier (QFI), Precedence value, Filters.

Further, if an established QoS flow can meet a QoS requirement of the newly established SDF, the SDF-level QoS control information includes a QFI of the established QoS flow. If no established QoS flow can meet a QoS requirement of the newly established SDF, the SDF-level QoS control information includes a QFI of a newly established QoS flow. Further, if the newly established QoS flow is a non-GBR QoS flow, the QoS parameter may include a 5QI. If the newly established QoS flow is a GBR QoS flow, the QoS parameter may include a 5QI, a notification, a GFBR, and an MFBR.

If the SMF entity determines, based on the received policy control rule information, to modify a policy control rule of a QoS requirement of an existing SDF, the SDF-level QoS control information includes an ID of the to-be-modified SDF. If an established QoS flow can meet a modified QoS requirement, the SDF-level QoS control information includes a QFI of the established QoS flow. If no established QoS flow can meet a modified QoS requirement, the SDF-level QoS control information includes a QFI of a newly established QoS flow and a QoS parameter corresponding to the new QoS flow. For example, a format of the SDF-level QoS control information may be: Update-SDF QoS: SDF ID, QFI, QoS parameters. Further, if the newly established QoS flow is a non-GBR QoS flow, the QoS parameter may include a 5QI. If the newly established QoS flow is a GBR QoS flow, the QoS parameter may include a 5QI, a notification, a GFBR, and an MFBR. The QoS parameter is optional.

If the SMF entity determines, based on the received policy control rule information, to modify a packet filter and/or a priority corresponding to an existing SDF, the SDF-level QoS control information includes an ID of the to-be-modified SDF, and a modified priority and/or a modified packet filter. For example, a format of the SDF-level QoS control information may be: Update-SDF Filters/Precedence: SDF ID, Filters/Precedence value.

If the SMF entity determines, based on the received policy control rule information, to delete an existing SDF, the SDF-level QoS control information includes an ID of the to-be-deleted SDF. For example, a format of the SDF-level QoS control information may be: Delete-SDF: SDF ID, delete operation.

In addition, if the SMF entity determines, based on the received policy control rule information, that a new QoS flow needs to be established, the session management request further independently includes QoS flow information, where the QoS flow information includes a QFI and a QoS parameter and is used to instruct a RAN/AN to store the QoS flow information and establish a corresponding air interface resource or bind the QoS flow to an existing air interface resource. If the SMF entity determines, based on the received policy control rule information, that a QoS flow needs to be deleted, the session management request further independently includes a QFI of the QoS flow, where the QFI is used to instruct the RAN/AN to release an air interface resource.

Step 604: The AMF sends an N2 session request to a RAN/AN using an N2 interface, where the N2 session request includes NAS signaling (for example, a PDU session modification command, where the PDU session modification command is used as an example for description in the figure), and the NAS signaling includes the SDF-level QoS control information.

Optionally, if a new QoS flow needs to be established, the N2 session request further indicates that the RAN/AN needs to store information about the newly established QoS flow, and establish a corresponding air interface resource with a terminal or bind the newly established QoS flow to an existing air interface resource. If a QoS flow needs to be deleted, the N2 session request further indicates that the RAN/AN needs to delete corresponding QoS flow information, such that the RAN/AN releases an air interface resource with the terminal.

Step 605: The RAN/AN sends a radio resource control request to a terminal, where the request includes a PDU session modification command. Additionally, the PDU session modification command includes the SDF-level QoS control information, such that the terminal performs QoS control on an uplink data packet based on the SDF-level QoS control information, or deletes the corresponding SDF information.

Step 606: The terminal returns an acknowledgement message to the RAN/AN after receiving the SDF-level QoS control information.

The terminal stores the SDF-level QoS control information, and performs the QoS control on the uplink data packet based on the SDF-level QoS control information, or deletes the locally stored SDF-level QoS control information.

The SDF-level QoS control information may be stored in the terminal in the following forms:
SDF ID1: Precedence value, QFI, Filters;
SDF ID2: Precedence value, QFI, Filters;
...

Step 607: The RAN/AN returns an N2 session response to the AMF using the N2 interface.

Step 608: The AMF returns a session management response to the SMF, where the response includes a PDU session modification acknowledgement message.

Step 609: The SMF sends an N4 session modification request to the UPF using an N4 interface, where the request optionally includes the SDF-level QoS control information.

When the session modification request is used to add an SDF, the UPF generates, based on the SDF-level QoS control information, at least one SDF-level packet filter in a QoS flow corresponding to the added SDF, and the at least one generated SDF-level packet filter has a same priority.

When the session modification request is used to modify information about an existing SDF, the UPF modifies the information about the SDF. For example, to modify a priority of the existing SDF, the UPF modifies a priority of a packet filter corresponding to the SDF.

When the session modification request is used to delete an existing SDF, the UPF deletes a packet filter corresponding to the SDF and other information about the SDF.

Step 610: The UPF returns an N4 session modification response to the SMF using the N4 interface.

Step 611: The SMF returns a PDU-CAN session modification acknowledgement message to the PCF.

According to step 601 to step 611, the QoS control information stored in the terminal and the UPF is modified, such that the terminal and the UPF can perform QoS control on an uplink/downlink data packet based on the same SDF-level QoS control information. Certainly, in some cases, for example, when network load is relatively large, priorities of services need to be rearranged to ensure that QoS of some services is not affected. Alternatively, the SMF may actively initiate a process of modifying the SDF-level QoS control information, to be more specific, step 601 and step 611 may not be performed.

When needing to send an uplink data packet, the terminal performs, based on SDF-level priorities, matching between the uplink data packet and a packet filter corresponding to an SDF with a highest priority. If the matching between the uplink data packet and the packet filter corresponding to the SDF with the highest priority succeeds, the terminal transmits the uplink data packet using a QoS flow corresponding to the filter. Otherwise, the terminal continues to perform matching between the uplink data packet and a packet filter corresponding to an SDF with a second highest priority, until an appropriate packet filter is found through matching. When receiving the uplink data packet, the UPF performs data packet matching based on the same SDF-level QoS control information. Therefore, a QoS flow that corresponds to the data packet and that is determined by the UPF is the same as a QoS flow determined by the terminal, such that a packet loss can be avoided.

Embodiment 2

Figure 7:
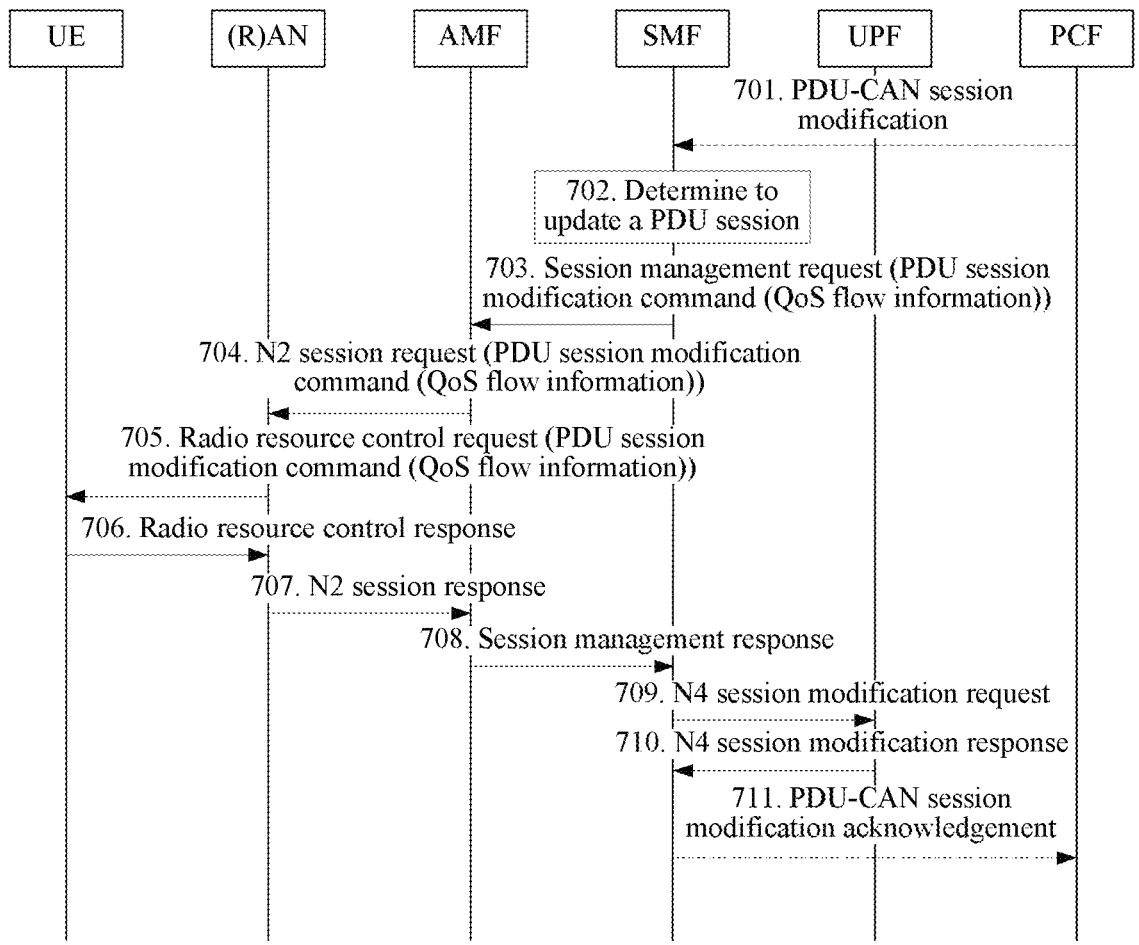
FIG. 7 is a schematic flowchart of Embodiment 2 according to embodiments of this application.

A procedure is described with reference to FIG. 7.

Step 701: A PCF entity sends a PDU-CAN session modification request to an SMF entity, where the request includes a policy control rule information.

Optionally, the policy control rule information is used to establish a new policy control rule; or the policy control rule information is used to modify an existing policy control rule; or the policy control rule information is used to delete an existing policy control rule.

Step 702: After receiving the PDU-CAN session modification request, the SMF determines to perform a PDU session update procedure.

Step 703: The SMF sends a session management request to an AMF, where the session management request includes NAS signaling (for example, a PDU session modification command, where the PDU session modification command is used as an example for description in the figure). Additionally, the NAS signaling includes the foregoing SDF-level QoS control information, namely, QoS flow information.

If the SMF entity determines, based on the received policy control rule information, to establish a new QoS flow, the SDF-level QoS control information includes a QFI of the newly established QoS flow, an ID of an SDF, a priority of the SDF, and a packet filter. The SDF corresponding to the newly established QoS flow may be an existing SDF or a newly established SDF. For example, a format of the SDF-level QoS control information may be: QFI, QoS parameters, SDF ID, Precedence value, Filters. Further, if the newly established QoS flow is a non-GBR QoS flow, the QoS parameter may include a 5QI. If the newly established QoS flow is a GBR QoS flow, the QoS parameter may include a 5QI, a notification, a GFBR, and an MFBR. The QoS parameter is optional.

If the SMF entity determines, based on the received policy control rule information, to modify an existing QoS flow, the SDF-level QoS control information includes a QFI of the to-be-modified QoS flow, an ID of an SDF, a priority of the SDF, and a packet filter. For a modified SDF corresponding to the QoS flow, a new SDF may be added, or an existing SDF may be deleted, or a new SDF may not be added and an existing SDF may not be deleted, but only a priority and/or a packet filter of the existing SDF is modified. For example, a format of the SDF-level QoS control information may be: QFI, SDF ID, Filters/Precedence value.

If the SMF entity determines, based on the received policy control rule information, to delete an existing QoS flow, the SDF-level QoS control information may include only an identifier of the to-be-deleted QoS flow.

In addition, if the SMF entity determines, based on the received policy control rule information, that a new QoS flow needs to be established, the session management request further independently includes QoS flow information, where the QoS flow information includes a QFI and a QoS parameter and is used to instruct a RAN/AN to store the QoS flow information and establish a corresponding air interface resource or bind the QoS flow to an existing air interface resource. If the SMF entity determines, based on the received policy control rule information, that a QoS flow needs to be deleted, the session management request further independently includes a QFI of the QoS flow, where the QFI is used to instruct the RAN/AN to release an air interface resource.

Step 704: The AMF sends an N2 session request to a RAN/AN using an N2 interface, where the N2 session request includes NAS signaling (for example, a PDU session modification command, where the PDU session modification command is used as an example for description in the figure). Additionally, the NAS signaling includes the SDF-level QoS control information.

Further, if a new QoS flow needs to be established, the N2 session request further instructs that the RAN/AN needs to store information about the newly established QoS flow, and establish a corresponding air interface resource with a terminal or bind the newly established QoS flow to an existing air interface resource. If a QoS flow needs to be deleted, the N2 session request further instructs that the RAN/AN needs to delete corresponding QoS flow information, such that the RAN/AN releases an air interface resource with the terminal.

Step 705: The RAN/AN sends a radio resource control request to a terminal, where the request includes a PDU session modification command. Additionally, the PDU session modification command includes the SDF-level QoS control information, such that the terminal performs QoS control on an uplink data packet based on the SDF-level QoS control information, or deletes the corresponding QoS flow information.

Step 706: The terminal returns an acknowledgement message to the RAN/AN after receiving the SDF-level QoS control information.

The terminal stores the SDF-level QoS control information, and performs the QoS control on the uplink data packet based on the SDF-level QoS control information, or deletes the locally stored SDF-level QoS control information.

The SDF-level QoS control information may be stored in the terminal in the following forms:
QFI 1: SDF ID 1, Precedence value, Filters;
   SDF ID 2, Precedence value, Filters;
QFI 2: SDF ID 3, Precedence value, Filters;
   SDF ID 4, Precedence value, Filters;
. . .

Step 707: The RAN/AN returns an N2 session response to the AMF using the N2 interface.

Step 708: The AMF returns a session management response to the SMF, where the response includes a PDU session modification acknowledgement message.

Step 709: The SMF sends an N4 session modification request to the UPF using an N4 interface, where the request optionally includes the SDF-level QoS control information.

When the session modification request is used to add a QoS flow, the UPF generates, in the added QoS flow based on the SDF-level QoS control information, at least one SDF-level packet filter of an SDF corresponding to the QoS flow, and the at least one generated SDF-level packet filter has a same priority.

When the session modification request is used to modify information about an existing QoS flow, the UPF modifies the information about the QoS flow.

When the session modification request is used to delete an existing QoS flow, the UPF deletes information about the QoS flow.

Step 710: The UPF returns an N4 session modification response to the SMF using the N4 interface.

Step 711: The SMF returns a PDU-CAN modification acknowledgement message to the PCF.

According to step 701 to step 711, both the terminal and the UPF perform QoS control on an uplink/downlink data packet based on the same SDF-level QoS control information.

When needing to send an uplink data packet, the terminal performs, based on SDF-level priorities, matching between the uplink data packet and a packet filter corresponding to an SDF with a highest priority. If the matching between the uplink data packet and the packet filter corresponding to the SDF with the highest priority succeeds, the terminal transmits the uplink data packet using a QoS flow corresponding to the filter. Otherwise, the terminal continues to perform matching between the uplink data packet and a packet filter corresponding to an SDF with a second highest priority, until an appropriate packet filter is found through matching. When receiving the uplink data packet, the UPF performs data packet matching based on the same SDF-level QoS control information. Therefore, a QoS flow that corresponds to the data packet and that is determined by the UPF is the same as a QoS flow determined by the terminal, such that a packet loss can be avoided.

Similarly, in some cases, alternatively, the SMF may actively initiate a process of modifying the SDF-level QoS control information. To be more specific, step 701 and step 711 may not be performed.

The SDF-level QoS control information in Embodiment 2 is slightly different from the SDF-level QoS control information in Embodiment 1 in information content and an information format. However, the QoS control information in Embodiment 1 and the QoS control information in Embodiment 2 are both implemented based on an SDF level, and different SDFs correspond to different priorities. Therefore, in Embodiment 2, a process of performing the QoS control on the uplink/downlink data packet by the terminal is the same as a process of performing the QoS control on the uplink/downlink data packet by the UPF.

When needing to send an uplink data packet, the terminal performs, based on SDF-level priorities, matching between the uplink data packet and a packet filter corresponding to an SDF with a highest priority. If the matching between the uplink data packet and the packet filter corresponding to the SDF with the highest priority succeeds, the terminal transmits the uplink data packet using a QoS flow corresponding to the filter. Otherwise, the terminal continues to perform matching between the uplink data packet and a packet filter corresponding to an SDF with a second highest priority, until an appropriate packet filter is found through matching. When receiving the uplink data packet, the UPF performs data packet matching based on the same SDF-level QoS control information. Therefore, a QoS flow that corresponds to the data packet and that is determined by the UPF is the same as a QoS flow determined by the terminal, such that a packet loss can be avoided.

Embodiment 3

Figure 8:
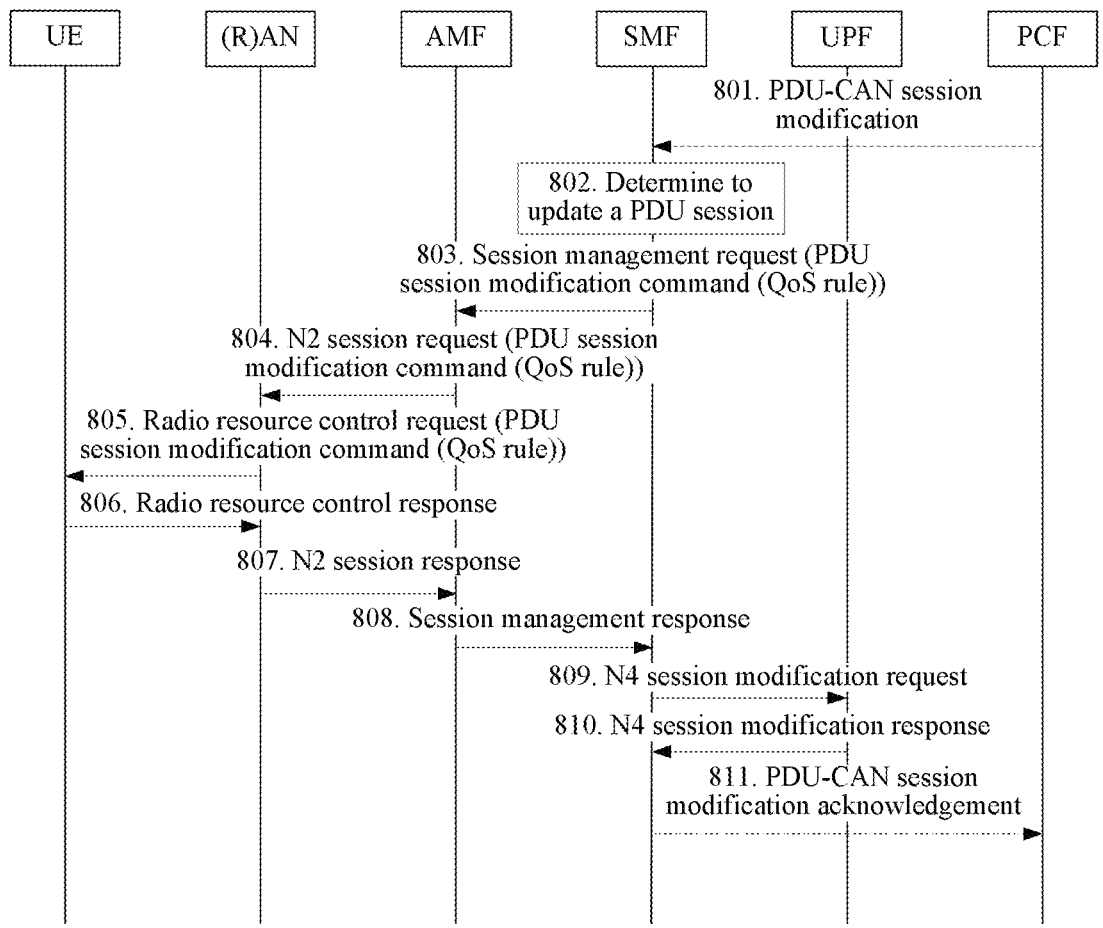
FIG. 8 is a schematic flowchart of Embodiment 3 according to embodiments of this application.

A procedure is described with reference to FIG. 8.

Step 801: A PCF sends a PDU-CAN session modification request to an SMF, where the request includes policy control rule information.

Optionally, the policy control rule information is used to establish a new policy control rule; or the policy control rule information is used to modify an existing policy control rule; or the policy control rule information is used to delete an existing policy control rule.

Step 802: After receiving the PDU session modification request, the SMF determines to perform a PDU session update procedure.

Step 803: The SMF sends a session management request to an AMF, where the session management request includes NAS signaling (for example, a PDU session modification command, where the PDU session modification command is used as an example for description in the figure). Additionally, the NAS signaling includes the foregoing SDF-level QoS control information, namely, a QoS rule.

If the SMF entity determines, based on the received policy control rule information, to establish a new QoS rule, the SDF-level QoS control information includes a QoS rule identifier (QoS rule ID) of the newly established QoS rule, a packet filter, a priority, a QFI, and a QoS parameter. For example, a format of the SDF-level QoS control information may be: QoS rule ID, QFI, QoS parameters, Precedence value, Filters. If there is an existing QoS flow that can meet a QoS requirement corresponding to the newly established QoS rule, the QFI is a QFI of the existing QoS flow. If there is no existing QoS flow that can meet a QoS requirement corresponding to the newly established QoS rule, a new QoS flow needs to be established, and the QFI is a QFI of the newly established QoS flow. Further, if the newly established QoS flow is a non-GBR QoS flow, the QoS parameter may include a 5QI. If the newly established QoS flow is a GBR QoS flow, the QoS parameter may include a 5QI, a notification, a GFBR, and an MFBR. The QoS parameter is optional.

If the SMF entity determines, based on the received policy control rule information, to modify a QoS requirement of an existing QoS rule, the SDF-level QoS control information includes an ID of the to-be-modified QoS rule. If an established QoS flow can meet a modified QoS requirement, the SDF-level QoS control information includes a QFI of the established QoS flow. If no established QoS flow can meet a modified QoS requirement, the SDF-level QoS control information includes a QFI of a newly established QoS flow and a QoS parameter corresponding to the new QoS flow. For example, a format of the SDF-level QoS control information may be: QoS rule ID, QoS flow ID, QoS parameters.

If the SMF entity determines, based on the received policy control rule information, to modify a packet filter and/or a priority corresponding to an existing QoS rule, the SDF-level QoS control information includes an ID of the to-be-modified QoS rule, and a modified priority and/or a modified packet filter.

If the SMF entity determines, based on the received policy control rule information, to delete an existing SDF, the SDF-level QoS control information includes an ID of the to-be-deleted QoS rule.

In addition, if the SMF entity determines, based on the received policy control rule information, that a new QoS flow needs to be established, the session management request further independently includes QoS flow information, where the QoS flow information includes a QFI and a QoS parameter and is used to instruct a RAN/AN to store the QoS flow information and establish a corresponding air interface resource or bind the QoS flow to an existing air interface resource. If the SMF entity determines, based on the received policy control rule information, that a QoS flow needs to be deleted, the session management request further independently includes a QFI of the QoS flow, where the QFI is used to instruct the RAN/AN to release an air interface resource.

Step 804: The AMF sends an N2 session request to a RAN/AN using an N2 interface, where the N2 session request includes NAS signaling (for example, a PDU session modification command, where the PDU session modification command is used as an example for description in the figure). Additionally, the NAS signaling includes the SDF-level QoS control information.

Optionally, if a new QoS flow needs to be established, the N2 session request further instructs that the RAN/AN needs to store information about the newly established QoS flow, and establish a corresponding air interface resource with a terminal or bind the newly established QoS flow to an existing air interface resource. If a QoS flow needs to be deleted, the N2 session request further instructs that the RAN/AN needs to delete corresponding QoS flow information, such that the RAN/AN releases an air interface resource with the terminal.

Step 805: The RAN/AN sends a radio resource control request to a terminal, where the request includes a PDU session modification command, and the PDU session modification command includes the SDF-level QoS control information. As such, the terminal performs QoS control on an uplink data packet based on the SDF-level QoS control information, or deletes corresponding QoS rule information.

Step 806: The terminal returns an acknowledgement message to the RAN/AN after receiving the SDF-level QoS control information.

The terminal stores the SDF-level QoS control information, and performs the QoS control on the uplink data packet based on the SDF-level QoS control information, or deletes the locally stored SDF-level QoS control information.

The SDF-level QoS control information may be stored in the terminal in the following forms:

QoS Rule ID1: Precedence value, QFI, Filters;
QoS Rule ID2: Precedence value, QFI, Filters;
. . .

Step 807: The RAN/AN returns an N2 session response to the AMF using the N2 interface.

Step 808: The AMF returns a session management response to the SMF, where the response includes a PDU session modification acknowledgement message.

Step 809: The SMF sends an N4 session modification request to the UPF using an N4 interface, where the request optionally includes the SDF-level QoS control information.

When the session modification request is used to add a QoS rule, the UPF generates, for a QoS flow corresponding to the added QoS rule based on the SDF-level QoS control information, at least one SDF-level packet filter of an SDF corresponding to the QoS flow, and the at least one generated SDF-level packet filter has a same priority.

When the session modification request is used to modify an existing QoS rule, the UPF modifies information of the QoS rule.

When the session modification request is used to delete an existing QoS rule, the UPF deletes all information of the QoS rule.

Step 810: The UPF returns an N4 session modification response to the SMF using the N4 interface.

Step 811: The SMF returns a PDU-CAN modification acknowledgement message to the PCF.

According to step 801 to step 811, both the terminal and the UPF perform QoS control on an uplink/downlink data packet based on the same SDF-level QoS control information.

When needing to send an uplink data packet, the terminal performs, based on SDF-level priorities, matching between the uplink data packet and a packet filter corresponding to an SDF with a highest priority. If the matching between the uplink data packet and the packet filter corresponding to the SDF with the highest priority succeeds, the terminal transmits the uplink data packet using a QoS flow corresponding to the filter. Otherwise, the terminal continues to perform matching between the uplink data packet and a packet filter corresponding to an SDF with a second highest priority, until an appropriate packet filter is found through matching. When receiving the uplink data packet, the UPF performs data packet matching based on the same SDF-level QoS control information. Therefore, a QoS flow that corresponds to the data packet and that is determined by the UPF is the same as a QoS flow determined by the terminal, such that a packet loss can be avoided.

Similarly, in some cases, alternatively, the SMF may actively initiate a process of modifying the SDF-level QoS control information. To be more specific, step 801 and step 811 may not be performed.

The SDF-level QoS control information in Embodiment 3 is slightly different from the SDF-level QoS control information in Embodiment 1 and the SDF-level QoS control information in Embodiment 2 in information content and an information format. However, the QoS control information in Embodiment 1, the QoS control information in Embodiment 2, and the QoS control information in Embodiment 3 are all implemented based on an SDF level, and different SDFs correspond to different priorities. Therefore, in Embodiment 3, a process of performing the QoS control on the uplink/downlink data packet by the terminal is the same as a process of performing the QoS control on the uplink/downlink data packet by the UPF. Details are not described herein again.

Figure 9:
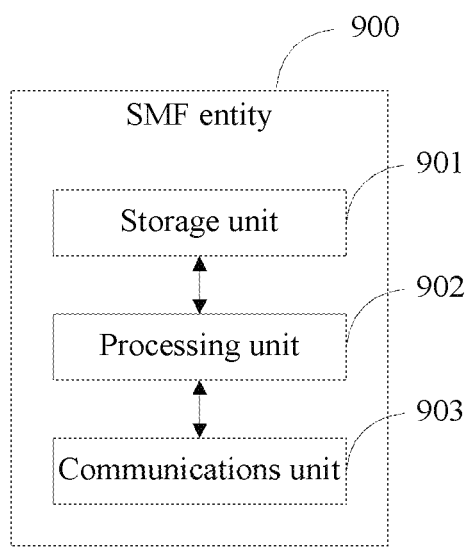
FIG. 9 is a first schematic structural diagram of an SMF entity according to an embodiment of this application.

FIG. 9 is a possible schematic structural diagram of the SMF entity in the foregoing embodiments. The SMF entity 900 can also implement a function of the SMF entity shown in FIG. 5, FIG. 6, FIG. 7, or FIG. 8.

The SMF entity 900 includes a processing unit 902 and a communications unit 903. The processing unit 902 is configured to control and manage actions of the SMF entity. For example, the processing unit 902 is configured to support the SMF entity in performing the processes 501 to 503 in FIG. 5, the processes 602, 603, and 609 in FIG. 6, the processes 702, 703, and 709 in FIG. 7, or the processes 802, 803, and 809 in FIG. 8, and/or another process used for the technologies described in this specification. The communications unit 903 is configured to support communication between the SMF entity and another network entity, for example, communication between the SMF entity and a functional module or a network entity shown in FIG. 5, FIG. 6, FIG. 7, or FIG. 8. The SMF entity may further include a storage unit 901 configured to store program code and data of the SMF entity.

It should be noted that unit division in this embodiment of the present application is an example and is merely logical function division. During actual implementation, there may be another division manner. The functional units in this embodiment of the present application may be integrated into one processing unit, or each of the units may exist alone physically, or two or more units are integrated into one unit. The integrated unit may be implemented in a form of hardware, or may be implemented in a form of a software functional unit.

The processing unit 902 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing unit 902 may implement or execute examples of various logical blocks, modules, and circuits that are described with reference to the content disclosed in the present application. Alternatively, the processor may be a combination implementing a computing function, for example, a combination including one or more microprocessors, or a combination of a DSP and a microprocessor. The communications unit 903 may be a transceiver. The storage unit 901 may be a memory.

Figure 10:
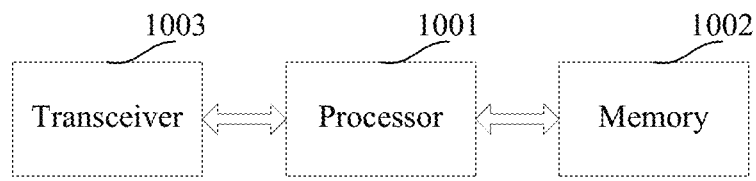
FIG. 10 is a second schematic structural diagram of an SMF entity according to an embodiment of this application.

When the processing unit 902 is a processor, the communications unit 903 is a transceiver, and the storage unit 901 is a memory, the SMF entity in this embodiment of the present application may be an SMF entity shown in FIG. 10.

Based on a same technical concept, FIG. 10 is another possible schematic structural diagram of the SMF entity in the foregoing embodiments. The SMF entity includes a processor 1001, a memory 1002 and a transceiver 1003 that are separately connected to the processor 1001.

The processor 1001 is configured to invoke a computer program pre-stored in the memory 1002 to perform the following steps: obtaining SDF-level QoS control information; and sending the SDF-level QoS control information to a terminal using the transceiver 1003.

In a possible implementation, the processor 1001 is further configured to send the SDF-level QoS control information to a UPF entity using the transceiver 1003, such that the UPF verifies QoS control on an uplink data packet based on the SDF-level QoS control information, or deletes the SDF-level QoS control information.

In a possible implementation, when obtaining the SDF-level QoS control information, the processor 1001 is configured to: obtain the SDF-level QoS control information based on a session management request sent by a PCF entity; or obtain the SDF-level QoS control information based on a local policy.

In a possible implementation, the SDF-level QoS control information includes: an SDF identifier; or an SDF identifier and at least one of or any combination of the following: at least one packet filter corresponding to the SDF, a priority, a QoS flow identifier, or a QoS parameter.

In a possible implementation, the SDF-level QoS control information includes: a QoS flow identifier; or a QoS flow identifier and at least one of or any combination of the following: at least one SDF identifier, at least one packet filter corresponding to the at least one SDF, a priority corresponding to the at least one SDF, or a QoS parameter corresponding to the QoS flow.

In a possible implementation, the SDF-level QoS control information includes: a QoS rule identifier; or a QoS rule identifier and at least one of or any combination of the following: at least one packet filter corresponding to the QoS rule, a priority, a QoS flow identifier, or a QoS parameter.

In a possible implementation, the processor 1001 is further configured to send, to an access network device using the transceiver 1003, the QoS flow identifier and the QoS parameter corresponding to the QoS flow, such that the access network device establishes a corresponding air interface resource.

Figure 11:
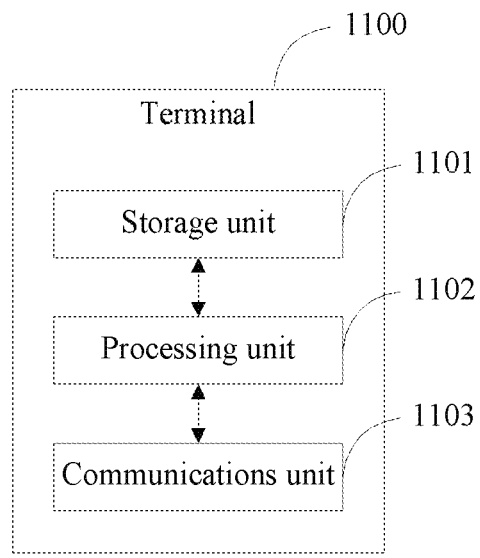
FIG. 11 is a first schematic structural diagram of a terminal according to an embodiment of this application.

FIG. 11 is a possible schematic structural diagram of the terminal in the foregoing embodiments. The terminal 1100 can also implement a function of the terminal shown in FIG. 6, FIG. 7, or FIG. 8.

The terminal 1100 includes a processing unit 1102 and a communications unit 1103. The processing unit 1102 is configured to control and manage actions of the terminal. For example, the processing unit 1102 is configured to support the terminal in performing the process 606 in FIG. 6, the process 706 in FIG. 7, the process 806 in FIG. 8, and/or another process used for the technologies described in this specification. The communications unit 1103 is configured to support communication between the terminal 1100 and another network entity, for example, communication between the terminal 1100 and a functional module or a network entity shown in FIG. 6, FIG. 7, or FIG. 8. The terminal 1100 may further include a storage unit 1101 configured to store program code and data of the terminal.

It should be noted that unit division in this embodiment of the present application is an example and is merely logical function division. During actual implementation, there may be another division manner. The functional units in this embodiment of the present application may be integrated into one processing unit, or each of the units may exist alone physically, or two or more units are integrated into one unit. For example, in the foregoing embodiment, a first obtaining unit and a second obtaining unit may be a same unit, or may be different units. The integrated unit may be implemented in a form of hardware, or may be implemented in a form of a software functional unit.

The processing unit 1102 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing unit 1102 may implement or execute examples of various logical blocks, modules, and circuits that are described with reference to the content disclosed in the present application. Alternatively, the processor may be a combination implementing a computing function, for example, a combination including one or more microprocessors, or a combination of a DSP and a microprocessor. The communications unit 1103 may be a transceiver. The storage unit 1101 may be a memory.

Figure 12:
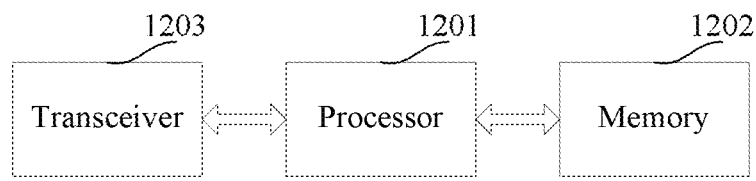
FIG. 12 is a second schematic structural diagram of a terminal according to an embodiment of this application.

When the processing unit 1102 is a processor, the communications unit 1103 is a transceiver, and the storage unit 1101 is a memory, the terminal in this embodiment of the present application may be a terminal shown in FIG. 12.

Based on a same technical concept, FIG. 12 is another possible schematic structural diagram of the terminal in the foregoing embodiments. The terminal includes a processor 1201, a memory 1202 and a transceiver 1203 that are separately connected to the processor 1201.

The processor 1201 is configured to invoke a computer program pre-stored in the memory 1202 to perform the following steps: receiving, using the transceiver 1203, SDF-level QoS control information sent by an SMF entity; and performing SDF-level QoS control on an uplink data packet based on the SDF-level QoS control information, or deleting the SDF-level QoS control information.

In a possible implementation, the SDF-level QoS control information includes: an SDF identifier; or an SDF identifier and one of or any combination of the following: at least one packet filter corresponding to the SDF, a priority, a QoS flow identifier, or a QoS parameter.

In a possible implementation, the SDF-level QoS control information includes: a QoS flow identifier; or a QoS flow identifier and at least one of or any combination of the following: at least one SDF identifier, at least one packet filter corresponding to the at least one SDF, a priority corresponding to the at least one SDF, or a QoS parameter corresponding to the QoS flow.

In a possible implementation, the SDF-level QoS control information includes: a QoS rule identifier; or a QoS rule identifier and at least one of or any combination of the following: at least one packet filter corresponding to the QoS rule, a priority, a QoS flow identifier, or a QoS parameter.

In a possible implementation, when performing the QoS control on the uplink data packet based on the SDF-level QoS control information, the processor 1201 is configured to: determine a matching order of SDF-level packet filters based on the priority in the SDF-level QoS control information; perform data packet matching based on the matching order of the SDF-level packet filters; and perform the QoS control based on a QoS flow corresponding to a packet filter that successfully matches the uplink data packet.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage device, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or another programmable device, thereby generating computer-implemented processing. Therefore, the instructions executed on the computer or another programmable device may provide steps for implementing a specific function in one or more processes in the flowcharts and/or in one or more blocks in the block diagrams.

A person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

The invention claimed is:

1. A method, comprising:
obtaining one or more service data flow (SDF)-level quality of service (QOS) rules from a session management function entity, wherein each of the one or more SDF-level QoS rules corresponds to an SDF and comprises a QOS rule identifier, at least one packet filter corresponding to the SDF, an SDF-level QoS rule precedence value corresponding to the SDF, and a QoS flow identifier;
performing matching between an uplink data packet and the at least one packet filter based on the SDF-level QoS rule precedence value until an appropriate SDF-level QoS rule is found, wherein one of the at least one packet filters in the appropriate SDF-level QoS rule matches the uplink data packet successfully; and
transmitting the uplink data packet using a QoS flow corresponding to an appropriate QoS flow identifier in the appropriate SDF-level QoS rule.

2. The method of claim 1, further comprising associating the QoS flow with a data radio bearer (DRB).

3. The method of claim 1, wherein the uplink data packet is verified based on SDF control information, and wherein the SDF control information comprises the at least one packet filter corresponding to the SDF, the SDF-level QoS rule precedence value, and the QoS flow identifier.

4. The method of claim 1, wherein different SDFs correspond to a same QoS flow.

5. The method of claim 4, wherein SDF-level QoS rule precedence values of the different SDFs are different.

6. The method of claim 1, wherein the at least one packet filter corresponding to the SDF comprises multiple packet filters corresponding to a same QoS flow, and wherein the same QoS flow is identified by the QoS flow identifier.

7. The method of claim 1, wherein the at least one packet filter corresponding to the SDF comprises multiple packet filters having a same SDF-level priority, and wherein the same SDF-level priority is associated with the SDF-level QoS rule precedence value.

8. The method of claim 1, wherein the QoS rule identifier is an SDF-level identifier.

9. The method of claim 1, further comprising obtaining a matching order based on the SDF-level QoS rule precedence value in the one or more SDF-level QoS rules, wherein performing matching comprises performing matching between the uplink data packet and the at least one packet filter in the one or more SDF-level QOS rules based on the matching order until the appropriate SDF-level QoS rule is found.

10. The method of claim 1, wherein performing the matching and transmitting the uplink data packet comprise:
performing, based on the SDF-level QoS rule precedence values, matching between the uplink data packet and at least one packet filter corresponding to an SDF with a highest priority;
transmitting, when the matching between the uplink data packet and the at least one packet filter corresponding to the SDF with the highest priority succeeds, the uplink data packet using a QoS flow corresponding to the at least one packet filter corresponding to the highest priority; and
continuing, when the matching between the uplink data packet and the at least one packet filter corresponding to the highest priority does not succeed, to perform matching between the uplink data packet and at least one packet filter corresponding to an SDF with a next highest priority until a matching packet filter is found.

11. A device comprising:
a memory configured to store instructions; and
one or more processors coupled to the memory and configured to execute the instructions to:
obtain one or more service data flow (SDF)-level quality of service (QOS) rules from a session management function entity, wherein each of the one or more SDF-level QoS rules corresponds to an SDF and comprises a QoS rule identifier, at least one packet filter corresponding to the SDF, an SDF-level QoS rule precedence value corresponding to the SDF, and a QoS flow identifier;
perform matching between an uplink data packet and the at least one packet filter based on the SDF-level QOS rule precedence value until an appropriate SDF-level QoS rule is found, wherein one of the at least one packet filters in the appropriate SDF-level QoS rule matches the uplink data packet successfully; and
transmit the uplink data packet using a QoS flow corresponding to an appropriate QoS flow identifier in the appropriate SDF-level QoS rule.

12. The device of claim 11, wherein the one or more processors are further configured to execute the instructions to associate the QoS flow with a data radio bearer (DRB).

13. The device of claim 11, wherein the device is a terminal.

14. The device of claim 11, wherein the uplink data packet is verified based on SDF control information, and wherein the SDF control information comprises the at least one packet filter corresponding to the SDF, the SDF-level QOS rule precedence value, and the QoS flow identifier.

15. The device of claim 11, wherein different SDFs correspond to a same QoS flow.

16. The device of claim 15, wherein SDF-level QOS rule precedence values of the different SDFs are different.

17. The device of claim 11, wherein the at least one packet filter corresponding to the SDF comprises multiple packet filters corresponding to a same QoS flow, and wherein the same QoS flow is identified by the QoS flow identifier.

18. The device of claim 11, wherein the at least one packet filter corresponding to the SDF comprises multiple packet filters having a same SDF-level priority, and wherein the same SDF-level priority is associated with the SDF-level QoS rule precedence value.

19. The device of claim 11, wherein the QOS rule identifier is an SDF-level identifier.

20. The device of claim 11, wherein the one or more processors are further configured to execute the instructions to:
obtain a matching order based on the SDF-level QoS rule precedence value in the one or more SDF-level QoS rules; and
in performing matching, perform matching between the uplink data packet and the at least one packet filter in the one or more SDF-level QoS rules based on the matching order until the appropriate SDF-level QoS rule is found.

21. The device of claim 11, wherein the one or more processors are further configured to execute the instructions to:
perform, based on the SDF-level QoS rule precedence values, matching between the uplink data packet and at least one packet filter corresponding to an SDF with a highest priority;
transmit, when the matching between the uplink data packet and the at least one packet filter corresponding to the SDF with the highest priority succeeds, the uplink data packet using a QoS flow corresponding to the at least one packet filter corresponding to the highest priority; and
continue, when the matching between the uplink data packet and the at least one packet filter corresponding to the highest priority does not succeed, to perform matching between the uplink data packet and at least one packet filter corresponding to an SDF with a next highest priority until a matching packet filter is found.

22. A computer program product comprising instructions stored on a non-transitory computer medium that, when executed by one or more processors, cause an apparatus to:
obtain one or more service data flow (SDF)-level quality of service (QOS) rules from a session management function entity, wherein each of the one or more SDF-level QoS rules corresponds to an SDF and comprises a QOS rule identifier, at least one packet filter corresponding to the SDF, an SDF-level QoS rule precedence value corresponding to the SDF, and a QoS flow identifier;
perform matching between an uplink data packet and the at least one packet filter based on the SDF-level QOS rule precedence value until an appropriate SDF-level QoS rule is found, wherein one of the at least one packet filters in the appropriate SDF-level QOS rule matches the uplink data packet successfully; and
transmit the uplink data packet using a QoS flow corresponding to an appropriate QoS flow identifier in the appropriate SDF-level QoS rule.

* * * * *